March 5, 1963  F. S. WEISS  3,079,957
TERMINAL WIRE FORMING AND ASSEMBLY APPARATUS
FOR ELECTRICAL COMPONENTS
Original Filed April 20, 1956  4 Sheets—Sheet 1

INVENTOR.
FELIX S. WEISS
BY Robert E. Isner
ATTORNEY

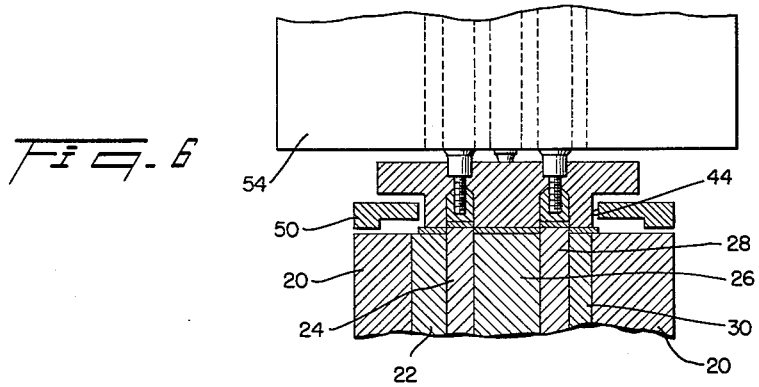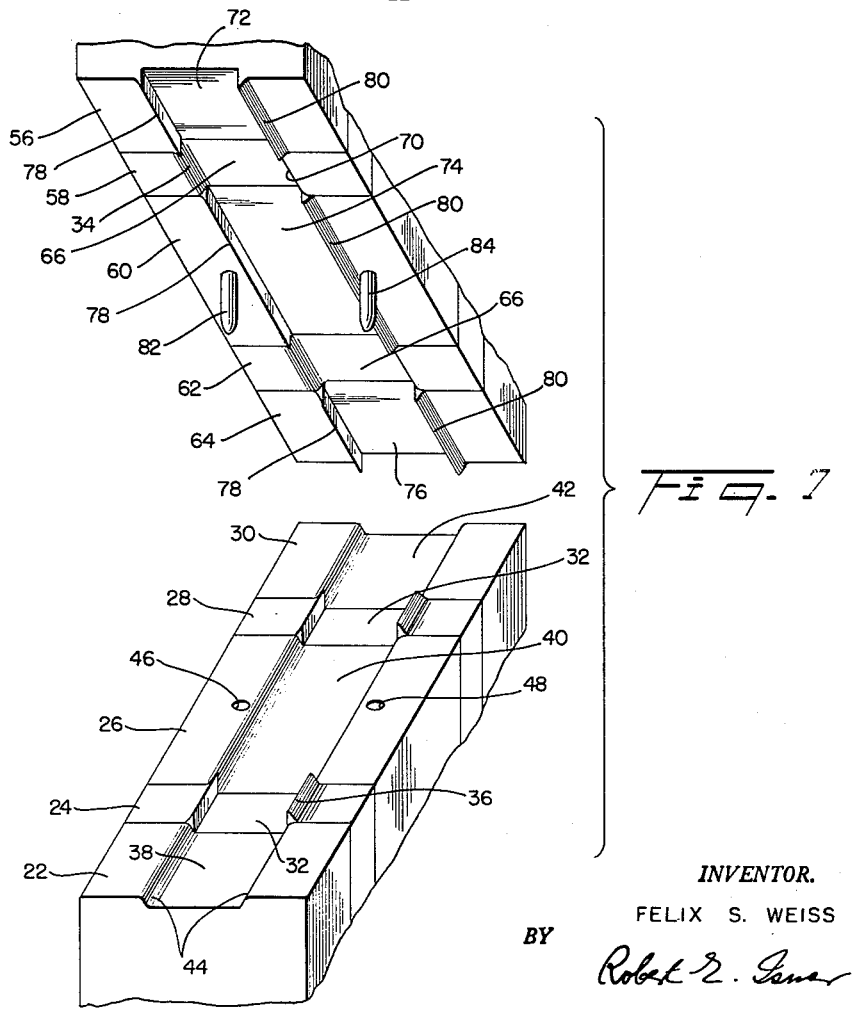

INVENTOR.
FELIX S. WEISS
BY Robert R. Turner
ATTORNEY

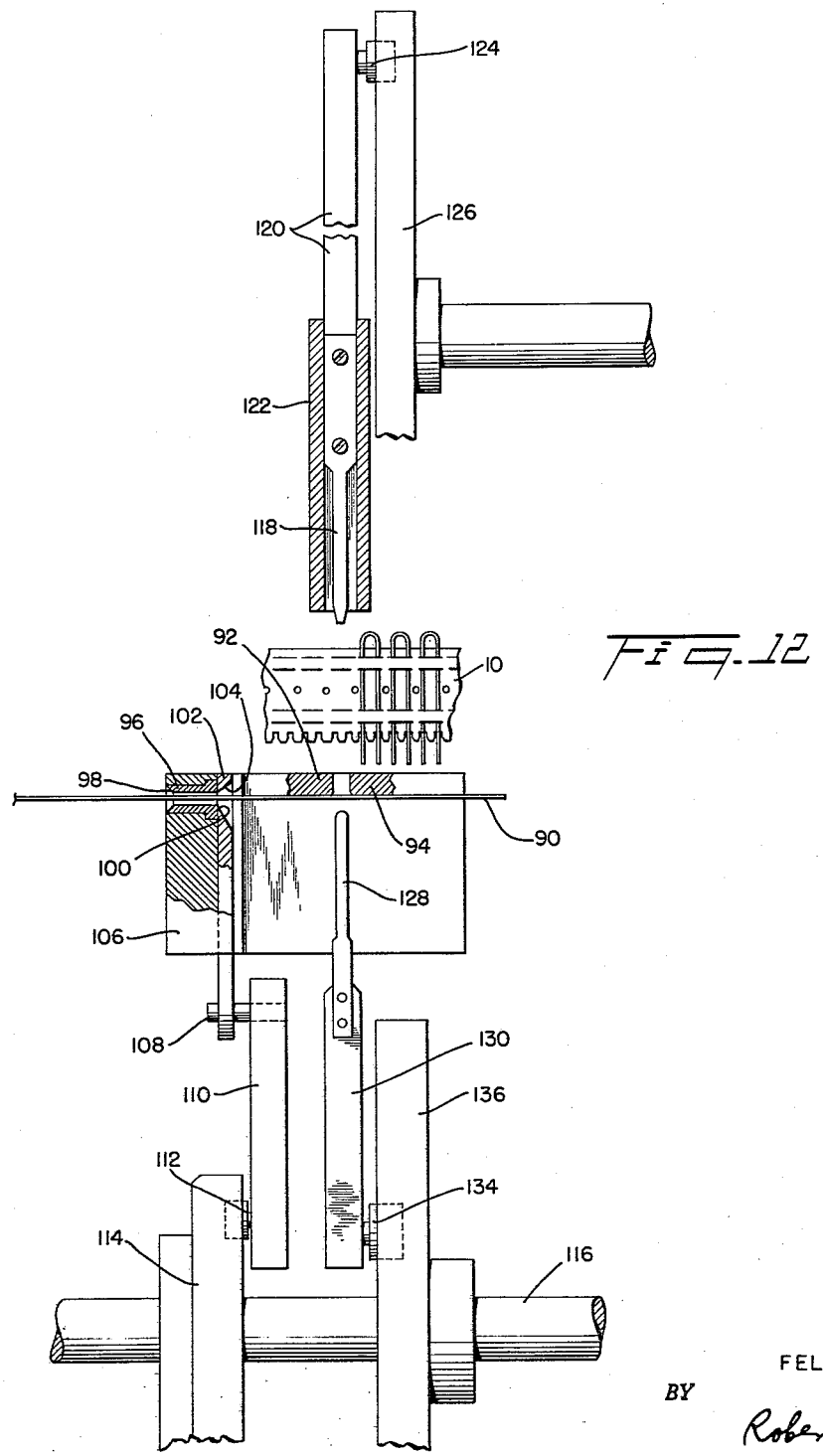

United States Patent Office 3,079,957
Patented Mar. 5, 1963

3,079,957
TERMINAL WIRE FORMING AND ASSEMBLY APPARATUS FOR ELECTRICAL COMPONENTS
Felix S. Weiss, Chestnut Hill, Mass., assignor to Cornell-Dubilier Electric Corporation, South Plainfield, N.J., a corporation of Delaware
Original application Apr. 20, 1956, Ser. No. 579,679. Divided and this application Mar. 13, 1959, Ser. No. 799,179
3 Claims. (Cl. 140—71)

This invention relates to certain improvements in machines for manufacturing capacitors, or similar relatively small electrical instrumentalities incorporating a plurality of extending terminal wires, by production line methods in which an effectively endless conveying medium, such as, in the preferred form here shown, a dispensable strip of flexible paperlike material, advances the material from which the capacitor or other electrical instrumentality is to be assembled and finally the capacitor or other electrical instrumentality itself through various operating stations at which sequential steps of assembly and eventually final processing, and if desirable, testing of the completed units are performed.

This application is a division of my application Serial No. 579,679 filed April 20, 1956, now abandoned, and is particularly concerned, as will hereinafter more fully be described, with improved structure for a processing or operating station at which the conveying medium is conditioned to receive a terminal wire subassembly and at which a terminal wire subassembly is formed and is disposed in removably secured operative relationship with said conveying medium to provide a novel and useful product in the form of a web mounted terminal wire subassembly.

The mechanical improvements and product which are the subject of this invention are adaptable to the above described general assembly method of production for the principles, purpose and object of increasing efficiency of production of such methods and the quality and uniformity of the articles so produced. While its principles may be advantageously used in the production of capacitors and other similar electrical instrumentalities such as resistors and rectifiers in various sizes and shapes and which incorporate a plurality of extending terminal wires and may be applied whether the conveying strip be made of one flexible material or another, the present invention is particularly useful in the production of ceramic disc capacitors which include a relatively small ceramic dielectric disc with a layer of conducting material disposed on each of the opposite faces thereof and serving as the electrode elements for the capacitor units. In the assembling of such units, suitable terminal or lead wires are secured to the conducting layers on the ceramic disc and the disc and adjacent portions of the terminal wires secured thereto are covered with a coating of suitable insulating material.

The success of the use of continuous assembly methods of the general type described in the manufacture of these ceramic disc type capacitors depends not only upon the rapidity and continuous flow of operations at the various assembly and processing stations, but also upon the accuracy and reproductability of those operations at each station, all to the end that each capacitor, as it comes to a point of completion, is as much like the preceding and following capacitors as possible.

These objectives are materially aided by the provision of uniformly positioned web mounted terminal wire subassemblies on a conveying medium in such manner as to permit desired positioning and manipulation thereof for subsequent operations and yet prevent any undesired displacement thereof occasioned by conveying medium displacement.

The invention may be briefly described as including novel and improved apparatus for forming a generally U-shaped, hairpin type, terminal wire subassembly of predetermined character from a length of straight wire stock in conjunction with the preparation of a web of suitably preconditioned conveyor material to form a terminal wire subassembly receiving channel therein together with associated means for effecting the introduction of said hairpin type terminal wire subassembly in said channel to produce a useful product in the form of a conveying medium having terminal wire subassemblies mounted in releasably secured operation relationship thereon for continuous assembly production line methods of manufacture of capacitor and similar relatively small electrical instrumentalities incorporating a plurality of extending terminal wires.

Among the advantages attendant the practice of this invention, apart from the obvious manufacturing economies that flow therefrom, is the provision of uniformly disposed web mounted terminal wire subassemblies wherein such wire subassemblies are disposed in slotlike channels transversely of the conveying web in which the characteristics of both the deformed web material and the U-shaped terminal wire subassemblies cooperate to provide a releasably secured operative engagement therebetween which permits desired positioning and manipulation of the wire subassemblies for subsequent operation and yet prevents any undesired displacement thereof that might be occasioned by displacement of the conveying medium.

The object of this invention is the provision of improved apparatus for automatically fabricating web mounted terminal wire subassemblies in the fabrication of capacitors and similar small electrical instrumentalities incorporating a plurality of extending terminal wires and by continuous assembly production line manufacturing methods.

Another object of this invention is the provision of a novel and useful product in the form of a web mounted terminal wire subassembly.

Other objects and advantages of the invention herein disclosed will be described in the following disclosure and claims and will be illustrated in the accompanying drawings which show, by way of example, the principles underlying the invention and the presently preferred embodiment incorporating those principles and by which said principles may be usefully employed in the production line fabrication of ceramic disc capacitors of a high degree of uniformity and with reduced fabrication costs.

Referring to the drawings:

FIG. 6 is a sectional view taken on the line 6—6 of FIG. 4;

FIG. 7 is an oblique view showing the die and punch surface configuration of web manipulating components included in the apparatus forming the subject matter of this invention;

FIG. 12 is a schematic plan view of the presently preferred terminal forming and insertion components;

As indicated above, the subject matter of the herein disclosed and claimed invention is of particular utility in the fabrication of ceramic disc type capacitors by production line methods; however, as will be apparent to those skilled in the art, some or all of the advantages attendant the practice of the invention are obtainable for similar operations for other and varied articles such as resistors and rectifiers and similar instrumentalities that incorporate a plurality of extending terminal wires that would undergo fabrication by the production line methods as generally described above. For the purpose of convenience, the herein specifically disclosed and described embodiment will be one that is particularly adapted for use in conjunction with the fabrication of ceramic disc capacitors by production line methods incorporating a conveyor strip.

Figure 1:
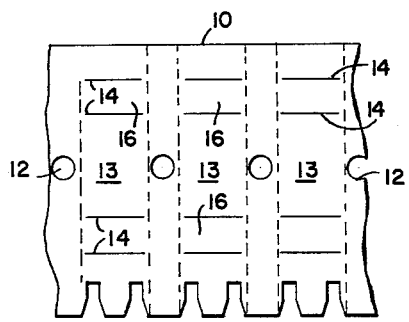
FIG. 1 is a schematic plan view of a strip conveyor conveniently employed in the practice of the herein disclosed invention and showing the preferred configuration thereof immediately prior to its introduction into the apparatus forming the subject matter of this invention.

Referring to the drawings, FIG. 1 illustrates a portion of an elongate conveyor strip 10 which may be formed, for example, of heavy paper or cardboard. The strip 10 should preferably have the properties of flexibility, internal resilience or elastic resistance to deformation and condition impervious mechanical strength as described in my copending application Serial No. 799,200 filed March 13, 1959. As described therein a material having the desired properties is C-3 Kraft Insulation Sheet as manufactured by the Stevens Paper Mills, Inc., of Windsor, Conn., in a thickness of about .010 inch. The conveyor strip 10 is preferably provided with a plurality of successive pilot hole perforations 12 uniformly spaced equal distances apart and preferably disposed substantially equidistant from the edges of the web. The perforations 12 permit careful indexing of the conveyor material in the various operating stations as well as conveniently providing means by which the web of conveyor material may be incrementally advanced during each operational cycle. Successive perforations 12 serve to define an article subassembly receiving area disposed therebetween as generally indicated by the area 13 disposed intermediate the dotted lines. Disposed within each area 13 is a pair of spaced pairs of transversely aligned longitudinally disposed slits 14 the longitudinal extent of which serves to define a pair of web integral retaining straps 16. The straps 16, when raised above the plane of the remainder of the strip 10, serve to form in cooperative relation with the adjacent portions of the web a transversely disposed terminal wire subassembly receiving channel.

In order to effect the desired mounting of a terminal wire subassembly on the conveyor strip 10, it is necessary to (a) manipulate the strip or web of conveyor material 10 so as to raise the straps 16 and form the subassembly receiving channel and (b) simultaneously form the terminal wire subassembly and manipulate the same so as to effect its insertion in the subassembly receiving channel.

Figure 13:
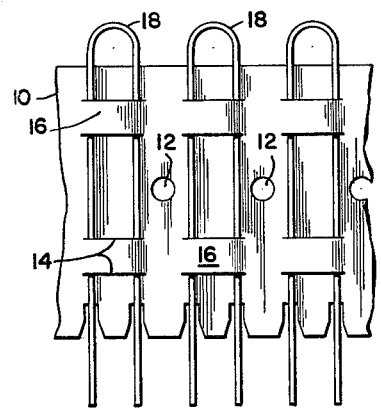
FIG. 13 is a schematic plan view of the web mounted terminal wire subassemblies as the same are delivered from the apparatus illustrated in the above enumerated drawings.
Figure 2:
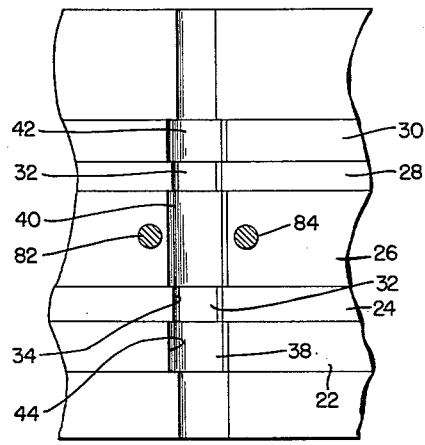
FIG. 2 is a sectional view taken on the line 2—2 of FIG. 4.
Figure 3:
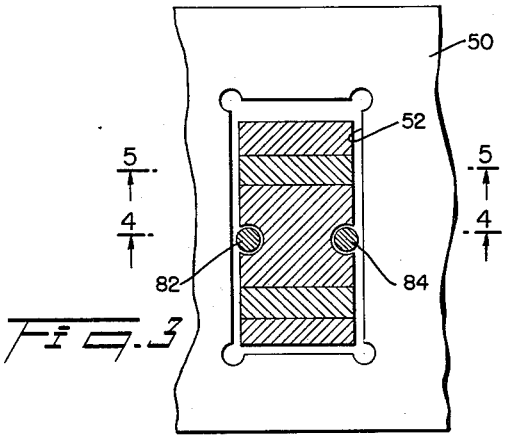
FIG. 3 is a sectional view taken on the line 3—3 of FIG. 4.

FIGURES 2 to 7 illustrate the mechanical essentials of the presently preferred web manipulating apparatus includable in an operating station adapted to effect the fabrication of web mounted terminal wire subassemblies for ceramic disc capacitors. The web manipulating apparatus is adapted to upwardly displace the strap portions 16 of the web 10 disposed intermediate each of slits in each of the pairs of longitudinal slits 14 therein relative to the remainder of said web to form a transverse terminal wire subassembly receiving channel for insertion therein of a terminal wire assembly 18 of the U-shaped hairpin type as illustrated in FIGURE 13.

Referring to the above indicated drawings, there is provided a stationary die block 20 having the upper surface thereof positioned to underlay the path of travel of the web 10. Mounted in the stationary die block 20 are five particularly contoured die inserts 22, 24, 26, 28 and 30 respectively (see FIGS. 6 and 7). The upwardly disposed operating surfaces of the die inserts 24 and 28 are similarly contoured and are positioned, transversely to the direction of the web advance, so as to be disposed respectively, beneath those portions 16 of the web 10 disposed intermediate each of the slits in each of the longitudinal pairs of slits 14.

Figure 4:
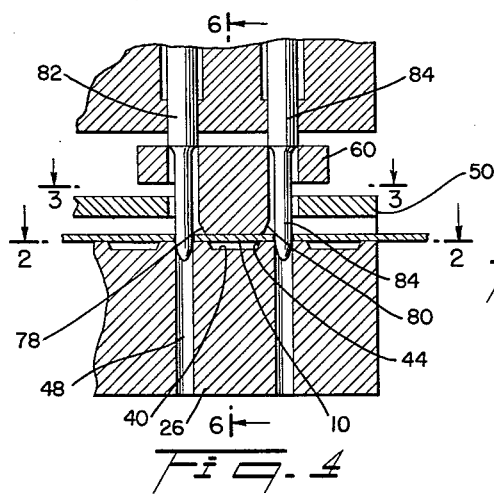
FIG. 4 is a sectional view taken on the line 4—4 of FIG. 3.
Figure 5:
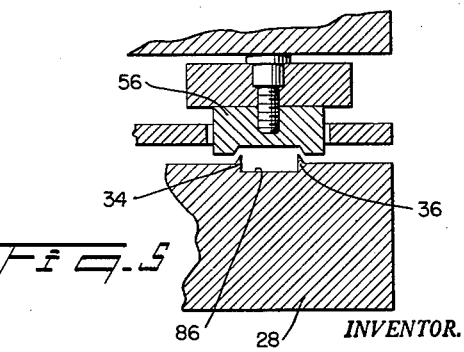
FIG. 5 is a sectional view taken on the line 5—5 of FIG. 3.

The operating surface of each of the die inserts 26, 28 is provided with a rectangularly shaped recess 32 bounded by a pair of transversely disposed upwardly directed shoulders 34 and 36. The shoulders 34, 36 are sized to extend upwardly beyond the outwardly adjacent die surface and are preferably sloped as indicated in the drawings. The die inserts 22 and 30 are positioned on either side of the above described die inserts 24, 28 and the die insert 26 is positioned between said inserts 24 and 28. So positioned, the die inserts 22, 26 and 30 are located to be disposed beneath those portions of the web material 10 positioned both externally to and intermediate the pairs of longitudinally disposed slits 14. The operating surfaces of the die inserts 22, 26 and 30 are provided with rectangularly shaped recesses 38, 40 and 42 respectively, the edges of which are sloped as at 44. As best shown in FIGURES 4 and 7, the centrally disposed die insert 26 is provided with a pair of pilot pin receiving bores 46, 48 adjacent the recess 40 therein. The die block 20 and the above described die inserts therein are positioned below a portion of a channeled web guide member 50 which is suitably apertured as at 52 to permit operative engagement of the die inserts by complementary vertically reciprocable pressure pad inserts to which we will now turn.

Cooperatively associated with the die pad 20 is a vertically reciprocable punch pad 54 having mounted therein five pressure pad inserts 56, 58, 60, 62 and 64. The pressure pad inserts 58 and 62 are positioned to cooperatively engage the die inserts 24 and 28 respectively and the operating surfaces thereof are provided with rectangular recesses 66 sized to conform with the corresponding recesses 32 in said die inserts. The sides of the recesses 66 are sloped as at 68 and 70 so as to conform with the sloped surface of the shoulders 34 and 36 on the die inserts 26 and 28. In a similar manner the punch pad inserts 56, 60 and 64 are positioned to engage the die inserts 38, 40 and 42 respectively, and the operating surfaces thereof are recessed as at 72, 74 and 76. The recesses 72, 74 and 76 are bounded by dependent shoulders such as at 78, 80, sized to extend downwardly beyond the adjacent punch pad surface and are provided with sloping sides contoured to conform with the sloping side walls 44 of the corresponding recesses 32, 40 and 42 in the die inserts 22, 26 and 30 respectively. The centrally disposed pressure pad insert 60 has mounted therein two dependent pilot pins 82 and 84 positioned to operatively engage, upon downward displacement thereof, the above described pilot pin receiving bores 46, 48 in the die insert 26.

Figure 11A:
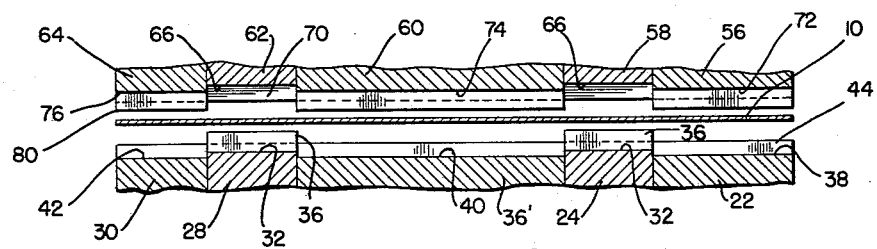
FIG. 11a is a sectional view as taken on the line 11—11 of FIG. 8 immediately prior to web deformation.
Figure 11B:
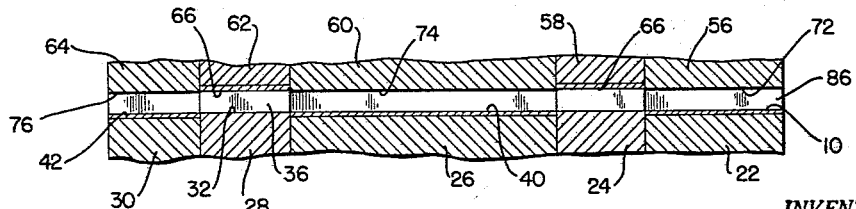
FIG. 11b is a sectional view as taken on the line 11—11 of FIG. 8 subsequent to web deformation and prior to the insertion of the terminal wire subassembly thereon.

In operation of the above described presently preferred web manipulating components, the vertically reciprocable pressure punch pad 54 and the pressure pad inserts 56, 58, 60, 62 and 64 mounted therein are maintained at or near the limit of upward displacement during the period in which the web 10 is advanced intermediate the channeled web guide 50 and the upper surface of the stationary die block 20. Upon cessation of the web advance portion of the cycle of operation, the web material will be disposed upon the upper surface of the die block 20 with successive pilot pin perforations 12 therein disposed in approximate alignment with the pilot pin receiving bores 46, 48 in the die insert 26. So positioned, the portions of the web material disposed intermediate the longitudinal slits in each of the pairs of slits 14 will be disposed in approximate alignment over the recesses 32 in the die inserts 26 and 28 respectively. Downward displacement of the punch pad 54 results initially in engagement of the pilot pin perforations 12 in the web material by the dependent rounded end pilot pins 82 and 84 and, if required, in minor corrective alignment of the web material 10 relative to the die inserts 22, 24, 26, 28 and 30. FIGURE 11a shows the disposition of the web material 10 immediately prior to compressive engagement thereof intermediate the die inserts 22, 24, 26, 28 and 30 and the pressure pad inserts 56, 58, 60, 62 and 64. Further downward displacement of the punch pad 54 results in compressive engagement of the web material 10, as illustrated in FIGURE 11b, intermediate the above identified die inserts and pressure pad inserts. Such compressive engagement of the web material 10 will result in the disposition of the portion 16 of the web material 10 included between the slits in the pairs of longitudinal slits 14 against the surface of the recesses 66 in the pressure pad inserts 58 and 62 by the action of the shoulders 34, 36 in the die inserts 24 and 28 and in the disposition of the remaining portions of the web material 10 against the surfaces of the recesses 38, 40 and 42 in the die inserts 22, 26 and 30 by the action of the dependent shoulders 78, 80 in the pressure pad inserts 56, 60 and 64. With the web material so disposed, there is formed a transverse substantially rectangular terminal wire subassembly receiving channel 86 defined in part by the disposition of the web material 10 as described above and in part by the recessed areas disposed intermediate the extending shoulders on both the die inserts and pressure pad inserts.

The above described compressive engagement of the web material 10 intermediate the die block 20 and its above described die inserts and the punch pad 54 and its above described pressure pad inserts is maintained while insertion of a suitably shaped terminal wire subassembly in the receiving channel 86 is effected.

Figure 8:
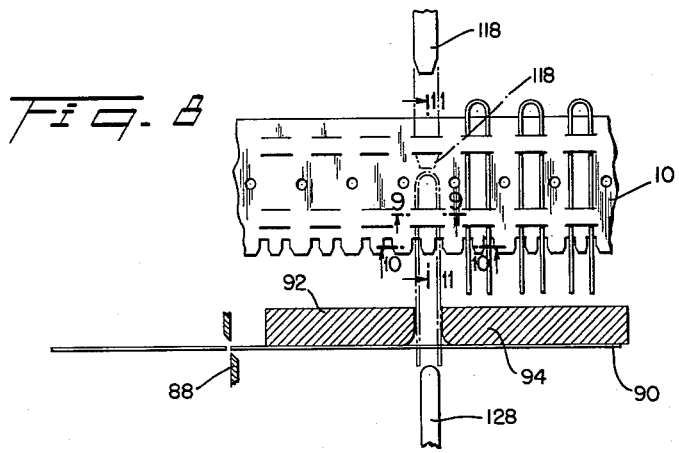
FIG. 8 is a schematic plan view representative of operations effected at the described terminal wire insertion apparatus.
Figures 9, 10:
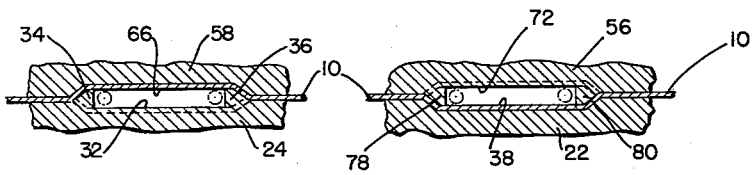
FIG. 9 is a sectional view taken on the line 9—9 of FIG. 8.
FIG. 10 is a sectional view taken on the line 10—10 of FIG. 8.

FIGURES 12 and 8 illustrate the essentials of the associated wire manipulating components adapted to cooperate with the heretofore described web manipulating components to effect the desired formation of a terminal wire subassembly and the insertion of said subassembly into the terminal wire subassembly receiving channel 86 formed in the web material 10. Referring to the above identified drawings, there is provided an associated terminal wire cutting assembly (schematically shown at 88 on FIGURE 8) arranged to sever an advanced length of terminal wire 90 positioned in front of a pair of stationary wire forming dies 92 and 94. As shown in more detail in FIGURE 12, the presently preferred terminal wire cutting assembly includes a stationary wire guide bushing 96 having an axially disposed bore 98 therewith sized to freely pass an advancing length of terminal wire 90 and to properly direct the advance of the same into operational location in front of the wire forming dies 92, 94. Positioned in sliding contact against the cutting edge 100 of the wire guide bushing 96 is a horizontally reciprocable cutting knife 102 having a substantially conically shaped aperture 104 therethrough with the apex thereof disposed adjacent to and in alignment with the bore 98 of the wire guide bushing 96. The terminal wire cutting knife 102 is mounted in a suitable fixed slide platform 106 and is horizontally reciprocated therein through the connecting pin 108 and an adjacent horizontally disposed slide 110. The drive slide 110 is connected to a cam follower lower 112 disposed in engagement with a suitably contoured drive cam 114 mounted on a drive shaft 116.

In operation of the unit, a length of straightened terminal wire 90 is advanced, by a suitable wire feed mechanism through the bore 98 in the terminal wire guide bushing 96 and through the aperture 104 in the cutting knife 102 and into position in front of the wire forming dies 92, 94. With the advanced length of terminal wire 90 so located, the drive slide 110 under control of the drive cam 114 is retracted. The retraction of the drive slide 110 is transmitted through the connecting pin 108 into equivalent retraction of the cutting knife 102 relative to the bushing 96. The retraction of the cutting knife 102 effects a horizontal displacement of the apex of the aperture 104 therein relative to the bore 98 in the bushing 96 and effects a sharp severing of the advanced length of the terminal wire 90. Following the severing of the terminal wire as described above, the drive slide 110 is advanced to again replace the aperture 104 in the knife 102 in alignment with the bore 98 in the wire guide bushing 96 to permit the subsequent advance of another length of terminal wire 90 into operative position in front of the wire forming dies 92, 94 during the next cycle of machine operation.

At the conclusion of the above described sequence of operation, a severed length of terminal wire 90 is positioned in front of the wire forming dies 92, 94. In order to form this length of terminal wire 90 into a terminal wire subassembly of the so-called "hairpin type" and to effect the insertion of such formed subassembly into terminal wire subassembly receiving channel 86 formed in the web 10, there is provided an elongated horizontally reciprocable pressure finger 118 positioned to be advanced into the terminal wire receiving channel 86 as defined by the web material 10 and the operative surfaces of the pressure pad inserts 56, 58, 60, 62 and 64 and the die inserts 22, 24, 26, 28 and 30. The pressure finger 118 is sized to pass through said channel and to abut the cut length of terminal wire 90 positioned immediately in front of the wire forming die members 92, 94. The pressure finger is mounted on a horizontally reciprocable drive slide 120 and is accurately positioned, with respect to its path of horizontal displacement, by a fixed slide platform 122. The drive slide 120 is connected to a cam follower 124 disposed in operative engagement with a suitably contoured drive cam 126. Cooperatively associated with the pressure finger 118 is an elongate horizontally reciprocable wire forming finger 128 positioned in front of the opening intermediate the die members 92, 94. The wire forming finger 128 is mounted on a horizontally reciprocable drive slide 130, and is accurately positioned, with respect to its path of reciprocation, by a fixed slide platform. The drive slide 130 is connected to a cam follower 134 disposed in operative engagement with a suitably contoured drive cam 136.

In operation of the unit and subsequent to the formation of the terminal wire subassembly receiving channel 86 by the previously described web manipulating components, the horizontally-reciprocable pressure finger 118 is advanced through said terminal wire subassembly receiving channel 86. At its limit of advance the end of the pressure finger 118 extends through the opening intermediate the die members 92, 94 and is disposed in abutting engagement with the terminal wire 90 positioned in front of said die members. With the pressure finger 118 so positioned, the wire forming finger 128 is advanced into abutting engagement against the other side of said terminal wire 90 positioned in front of said die members 92, 94. With the pressure finger 118 and wire forming finger 128 so positioned, the pressure finger 118 is retracted in conjunction with an advance of the wire forming finger 128. The advance of the wire forming finger 128 results in displacement of the terminal wire 90 through the opening between the wire forming dies 92 and 94 and in deformation of the same into a hairpin type terminal wire subassembly such as illustrated in FIGURE 13. Continued advance of the wire forming finger 128 and conjoint retraction of the pressure finger 118 results in insertion of said formed hairpin type terminal wire subassembly in the terminal wire receiving channel 86 in the web material 10 as also illustrated in said FIGURE 13. When the limit of advance of the wire forming finger 128 is reached, said forming finger is retracted and both the pressure finger 118 and the forming finger 128 are maintained in retracted position until the next cycle of the machine operation.

FIGURE 13 illustrates the character of the improved product in the form of a web mounted terminal wire subassembly that results from the operation of the above described mechanical elements.

As there set forth, the retaining straps 16 are displaced out of the plane of the remainder of the strip 10 and formed, in cooperative relation with the adjacent portions thereof, a transversely disposed article receiving channel adapted to contain a multiwire terminal subassembly such as the illustrated U-shaped "hairpin" type terminal lead assembly generally designated 150. The arms 152, 154 of the hairpin terminal lead assembly are disposed beneath the straps 16 and above the remainder of the strip surface in transverse alignment therewith. The disposition of the arms 152 and 154 in the crotches formed at the end of the slits 14 prevents any displacement of the hairpin terminal wire assembly 150 in the direction of strip length and deformation of the hairpin assembly within the channel may be minimized if not actually prevented by bending the tongue 156 upwardly along the foldline indicated by the dotted lines 158 intermediate the extending arm portion of the arms 152 and 154 at a location disposed inwardly of the strip edge 160. The internal resilience of the strip material coupled with the above described engagement of the hairpin lead assembly 150 by the straps 16 prevents displacement of the lead assembly 150 in a direction perpendicular to the strip surface and additionally minimizes, if not actually prevents, any undesired twisting or turning of the wires. Moreover, the internal resilience of the strip material coupled with the relatively large area of contact between the hairpin lead assembly 150 and the strip surface is sufficient to prevent undesired displacement of the lead assembly 150 within the channel and transversely to the strip as would be occasioned by strip flexing and bending encountered during its advance and yet to permit such displacements when desired to be effected by engagement of the hairpin lead assembly 150 by an operating element.

As the above description shows, the illustrated and described construction assures a positive releasably secured positioning of the terminal wire subassembly mounted thereon without resort to any extrinsic fastening means and, due to the positive uniform relationship between the pilot hole perforations 12 and the retaining straps 16, assures proper indexing and positioning of the strip mounted terminal wire subassembly with the operating elements of either the subsequent operations stations.

Having thus described my invention, I claim:

1. In fabricating machines for electrical components such as ceramic disc capacitors and similar relatively small electrical instrumentalities incorporating a plurality of extending terminal wires and of the class wherein an advancing web of dispensable conveyor material serves as a carrier for the electrical component constituent elements and progressively formed subassemblies thereof during the sequential stages of the fabricating process, cyclically operable means for inserting a terminal wire subassembly in a preslit conveyor web comprising a stationary die member and a vertically reciprocable pressure member having the web engaging surfaces thereof contoured to perpendicularly displace the portions of said web material disposed intermediate the slits therein relative to the plane of the remainder of said web material upon compressive engagement of said web material therebetween, said displaced portion of said web material in cooperation with the remainder of said compressively engaged web material defining a transversely disposed terminal wire subassembly receiving channel therein, a wire forming die positioned in transverse alignment with said terminal wire subassembly receiving channel and a wire forming finger member displaceable through said die and into said receiving channel for forming a terminal wire subassembly and introducing the same into said channel.

2. In fabricating machines for electrical components such as ceramic disc capacitors and similar relatively small electrical instrumentalities incorporating a plurality of extending terminal wires and of the class wherein an advancing web of dispensable conveyor material serves as a carrier for the electrical component constituent elements and progressively formed subassemblies thereof during the sequential stages of the fabricating process, cyclically operable means for inserting a terminal wire subassembly in a preslit conveyor web comprising a stationary die member and a vertically reciprocable pressure member having the web engaging surfaces thereof contoured to perpendicularly displace the portions of said web material disposed intermediate the slits therein relative to the plane of the remainder of said web material upon compressive engagement of said web material therebetween, said displaced portion of said web material in cooperation with the remainder of said compressively engaged web material defining a transversely disposed terminal wire subassembly receiving channel therein, a wire forming die positioned in transverse alignment with said terminal wire subassembly receiving channel, an elongate reciprocable feed finger displaceable through said receiving channel into adjacent operative relation with said wire forming die and a reciprocable wire forming finger member displaceable through said channel in conjunction with said feed finger for forcing a predetermined length of terminal wire through said wire forming die and into said terminal wire subassembly receiving channel in said web material.

3. In fabricating machines for electrical components such as ceramic disc capacitors and similar relatively small electrical instrumentalities incorporating a plurality of extending terminal wires and of the class wherein an advancing web of dispensable conveyor material serves as a carrier for the electrical component constituent elements and progressively formed subassemblies thereof during the sequential stages of the fabricating process, cyclically operable means for inserting a terminal wire subassembly in a preslit conveyor web comprising means for perpendicularly displacing the portions of the web material disposed intermediate the slits therein relative to the plane of the remainder of said web material to form a transversely disposed terminal wire subassembly receiving channel therein, wire forming die means positioned in transverse alignment with said terminal wire subassembly receiving channel and wire forming means displaceable through said die and into said receiving channel for forming a terminal wire subassembly and introducing the same into said channel.

References Cited in the file of this patent

UNITED STATES PATENTS

| | | |
|---|---|---|
| 1,309,660 | Smith | July 15, 1919 |
| 1,933,152 | Ryan | Oct. 31, 1933 |
| 2,486,450 | Wahl | Nov. 1, 1949 |
| 2,515,486 | Bertalan | July 18, 1950 |
| 2,694,849 | Douchet | Nov. 23, 1954 |
| 2,769,533 | Booth | Nov. 6, 1956 |
| 2,836,290 | Braun | May 27, 1958 |
| 2,929,130 | Packman | Mar. 22, 1960 |